US012487782B2

(12) United States Patent
Yoon et al.

(10) Patent No.: US 12,487,782 B2
(45) Date of Patent: Dec. 2, 2025

(54) RAID CONTROLLER, OPERATING METHOD OF RAID CONTROLLER AND STORAGE DEVICE

(71) Applicant: Samsung Electronics Co., Ltd., Suwon-si (KR)

(72) Inventors: Jihwan Yoon, Suwon-si (KR); Sanghee Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/583,290

(22) Filed: Feb. 21, 2024

(65) Prior Publication Data

US 2024/0289062 A1   Aug. 29, 2024

(30) Foreign Application Priority Data

Feb. 24, 2023   (KR) .................. 10-2023-0025282

(51) Int. Cl.
*G06F 3/00* (2006.01)
*G06F 3/06* (2006.01)

(52) U.S. Cl.
CPC .......... *G06F 3/0689* (2013.01); *G06F 3/0604* (2013.01); *G06F 3/0655* (2013.01)

(58) Field of Classification Search
CPC ..... G06F 3/0689; G06F 3/0604; G06F 3/0655
See application file for complete search history.

(56) References Cited

U.S. PATENT DOCUMENTS

| 8,244,966 | B2 | 8/2012 | Huang |
| 8,301,835 | B2 | 10/2012 | Kim |
| 8,566,508 | B2 | 10/2013 | Borchers et al. |
| 9,235,503 | B2 | 1/2016 | Brandt |
| 9,639,457 | B1* | 5/2017 | Piszczek ............ G06F 12/0246 |
| 9,766,837 | B2 | 9/2017 | McGlaughlin et al. |
| 2009/0055585 | A1* | 2/2009 | Fernandes .......... G06F 11/1076 |
| | | | 711/E12.001 |

(Continued)

FOREIGN PATENT DOCUMENTS

| CN | 113241110 A | 8/2021 |
| EP | 3495955 A2 | 6/2019 |

(Continued)

OTHER PUBLICATIONS

Extended European Search Report dated Jun. 27, 2024 for corresponding European Application No. 24158810.2.

*Primary Examiner* — Craig S Goldschmidt
(74) *Attorney, Agent, or Firm* — Harness, Dickey & Pierce, P.L.C.

(57) ABSTRACT

Provided is a redundant array of inexpensive disks (RAID) controller including a plurality of channel interfaces configured to receive a data strip for which it is distinguished in which data stripe the data strip is included by using a RAID identifier from each of a plurality of channels, split the data strip into a plurality of pieces of split data and store the split data, and assign a split identifier to each of the plurality of pieces of split data, a distributor configured to set, based on the split identifier, a transmission path of the plurality of pieces of split data, and a plurality of RAID buffer units configured to receive the split data through the distributor and manage parity data corresponding to the split data.

20 Claims, 12 Drawing Sheets

(56) References Cited

U.S. PATENT DOCUMENTS

| | | | |
|---|---|---|---|
| 2010/0199036 A1* | 8/2010 | Siewert | G06F 12/122 |
| | | | 711/E12.001 |
| 2015/0058700 A1* | 2/2015 | Yang | G06F 11/1012 |
| | | | 714/773 |
| 2018/0018096 A1 | 1/2018 | Fekete et al. | |
| 2020/0341874 A1* | 10/2020 | Zhuo | G06F 3/0659 |

FOREIGN PATENT DOCUMENTS

| KR | 10-1504632 B1 | 3/2015 |
|---|---|---|
| KR | 10-2018-0131839 A | 12/2018 |

\* cited by examiner

RAID CONTROLLER, OPERATING METHOD OF RAID CONTROLLER AND STORAGE DEVICE

CROSS-REFERENCE TO RELATED APPLICATION

This application is based on and claims priority under 35 U.S.C. § 119 to Korean Patent Application No. 10-2023-0025282, filed on Feb. 24, 2023, in the Korean Intellectual Property Office, the disclosure of which is incorporated by reference herein in its entirety.

BACKGROUND

The inventive concepts relate to redundant array of inexpensive disks (RAID) controllers capable of receiving data through multiple channels.

Various technologies have been proposed to improve the stability of data stored in a storage device. For example, a storage device may support RAID, and may secure data stability in various ways depending on a RAID level. For example, the storage device may include multiple cell regions, and may recover data that has failed, that is, has caused an error, using data and parity data stored in the cell regions.

Such a RAID operation may be performed by a RAID controller included in the storage device. In this case, since the performance of the RAID controller also affects the performance of the storage device, various developments are being made to improve the performance of RAID controllers.

SUMMARY

The inventive concepts provide redundant array of inexpensive disk (RAID) controllers having improved performance.

According to some aspects of the inventive concepts, there is provided a redundant array of inexpensive disk (RAID) controller including a plurality of channel interfaces configured to receive a data strip for which it is distinguished in which data stripe the data strip is included by using a RAID identifier from each of a plurality of channels, split the data strip into a plurality of pieces of split data and store the split data, and assign a split identifier to each of the plurality of pieces of split data, a distributor that sets a transmission path of the plurality of pieces of split data based on the split identifier, and a plurality of RAID buffer units that receive the split data through the distributor and manage parity data corresponding to the split data.

According to some aspects of the inventive concepts, there is provided an operation method of a redundant array of inexpensive disk (RAID) controller including a plurality of channel interfaces, a distributor, and a plurality of RAID buffer units, the operation method including receiving, by any one of the plurality of channel interfaces, a data strip in which it is distinguished whether to be included in a data stripe by using a RAID identifier, dividing the data strip into a plurality of pieces of split data by the channel interface having received the data strip, assigning a split identifier to each of the plurality of pieces of split data by the channel interface having received the data strip, by the distributor, setting a transmission path of each of the plurality of pieces of split data to one of the plurality of RAID buffer units, transmitting the plurality of pieces of split data to one of the plurality of RAID buffer units through the distributor, and calculating and storing parity data corresponding to the split data by each of the RAID buffer units.

According to some aspects of the inventive concepts, there is provided a storage device including a processor that outputs a data strip in which it is distinguish whether to be included in a data stripe by using a redundant array of inexpensive disk (RAID) identifier through a plurality of channels, a RAID controller that splits the data strip into a plurality of pieces of split data and generates a plurality of pieces of parity data corresponding to the plurality of pieces of split data, a volatile memory that temporarily stores the plurality of pieces of parity data generated by the RAID controller, and a non-volatile memory configured to store the plurality of pieces of parity data stored in the volatile memory, wherein the RAID controller includes a plurality of channel interfaces configured to split and store the data strip into the plurality of pieces of split data, and assign a split identifier to each of the plurality of pieces of split data, a distributor that sets a transmission path of the plurality of pieces of split data based on the split identifier, and a plurality of RAID buffer units that receive the split data through the distributor and manage parity data corresponding to the split data.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments of the inventive concepts will be described in detail with reference to the accompanying drawings.

Figure 1:
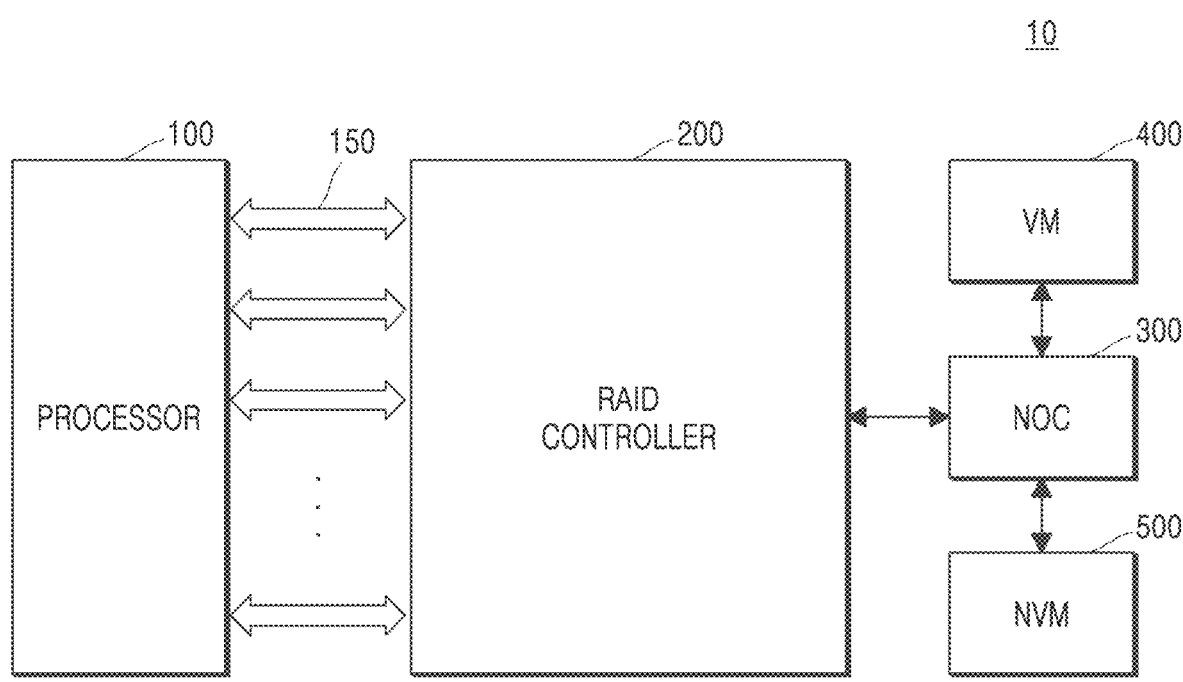
FIG. 1 is a block diagram illustrating a storage device according to some example embodiments.

FIG. 1 is a block diagram illustrating a storage device according to some example embodiments.

Referring to FIG. 1, a storage device 10 according to some example embodiments may include a processor 100, a plurality of channels 150, a Redundant Array of Inexpensive Disk (RAID) controller 200, a Network On Chip (NOC) 300, a Volatile Memory (VM) 400, and a Non-Volatile Memory (NVM) 500.

The processor 100 may control the overall operation of the storage device 10, and in some example embodiments, the processor 100 may be a central processing unit (CPU).

The processor 100 may store a data stripe in the non-volatile memory 500. In this case, the processor 100 may store a data stripe in the non-volatile memory 500 through a non-volatile memory controller that controls the non-volatile memory 500.

The data stripe may be a bundle of a plurality of data strips. The data strip may be a unit in which data is stored in the non-volatile memory 500, and may include data of a predetermined (or, alternatively, determined or desired) capacity (e.g., 4 KB). In this case, the data strips may be stored in a page at the same location in a plurality of flash memory chips included in the non-volatile memory 500.

The processor 100 may allocate a RAID identifier to each of the data strips. The RAID identifier may be an identifier for distinguishing in which data stripe a data strip is included, and the same RAID identifier may be assigned to multiple data strips bound by the same data stripe. In this case, the data strip to which the same RAID identifier is assigned by the processor 100 may be written to a page at the same location in the plurality of flash memory chips included in the non-volatile memory 500.

The processor 100 may output data strips to the RAID controller 200 through the plurality of channels 150. In this case, the processor 100 may output the data strips through any of the plurality of channels 150.

The processor 100 may output all of a plurality of data strips bound by the same data stripe to the RAID controller 200. Here, the processor 100 may output a plurality of data strips tied by the same data stripe to the RAID controller 200 through different channels from among the plurality of channels 150.

The plurality of channels 150 may be used as communication paths between the processor 100 and the RAID controller 200. In some example embodiments, the plurality of channels 150 may input data strips output through the processor 100 to the RAID controller 200.

The RAID controller 200 may receive data strips distinguished by using RAID identifiers through the plurality of channels 150 from the processor 100. The RAID controller 200 may split the data strip into a plurality of pieces of split data. The RAID controller 200 may generate a plurality of pieces of parity data corresponding to the plurality of pieces of split data.

A more detailed configuration and operation of the RAID controller 200 will be described later in more detail with reference to FIG. 2.

The NOC 300 may connect between the RAID controller 200, the volatile memory 400, and the non-volatile memory 500. The NOC 300 may be used as a data transfer path between the RAID controller 200, the volatile memory 400, and the nonvolatile memory 500. In some example embodiments, the NOC 300 may deliver parity data output from the RAID controller 200 to the volatile memory 400, and parity data output from the volatile memory 400 may be delivered to the RAID controller 200 or the non-volatile memory 500.

The volatile memory 400 may temporarily store a plurality of pieces of parity data generated by the RAID controller 200. The volatile memory 400 may temporarily store the plurality of pieces of parity data input through the NOC 300. The volatile memory 400 may output the plurality of pieces of temporarily stored parity data to the non-volatile memory 500 through the NOC 300.

The volatile memory 400 may be any one of a static random access memory (SRAM), a dynamic random access memory (DRAM), and the like.

The non-volatile memory 500 may store the plurality of pieces of parity data stored in the volatile memory 400. The non-volatile memory 500 may store the plurality of pieces of parity data input through the NOC 300.

The non-volatile memory 500 may include a plurality of flash memory chips (e.g., NAND memory chips) that store data to be nonvolatile. In this case, spaces inside the plurality of flash memory chips may be split into pages. In this case, the non-volatile memory 500 may store a plurality of pieces of parity data on a page at the same position as that of the page in which the plurality of data strips are stored in the plurality of flash memory chips, based on the generation of each of the plurality of pieces of parity data.

In more detail, each of the plurality of flash memory chips included in the non-volatile memory 500 may include a plurality of memory blocks. In addition, memory blocks in the same position in each of the plurality of flash memory chips may be included in a same memory block group. In this case, data strips stored on a page at the same position in the memory block included in the same memory block group may be grouped into the same data stripe. The parity data generated by the plurality of data strips included in the same data stripe may be stored on a page at the same position in the memory block included in the same memory block group as that of the page in which the plurality of data strips are stored.

As another example, any of the plurality of memory blocks included in the flash memory chip included in the non-volatile memory 500 may form a large zone. In this case, the data strips stored on the page at the same position in each of the plurality of memory blocks constituting the large zone may be tied with the same data stripe. The parity data generated by the plurality of data strips included in the same data stripe may be stored on a page at the same position in the memory block included in the same large zone as that of the page in which the plurality of data strips are stored.

Figure 2:
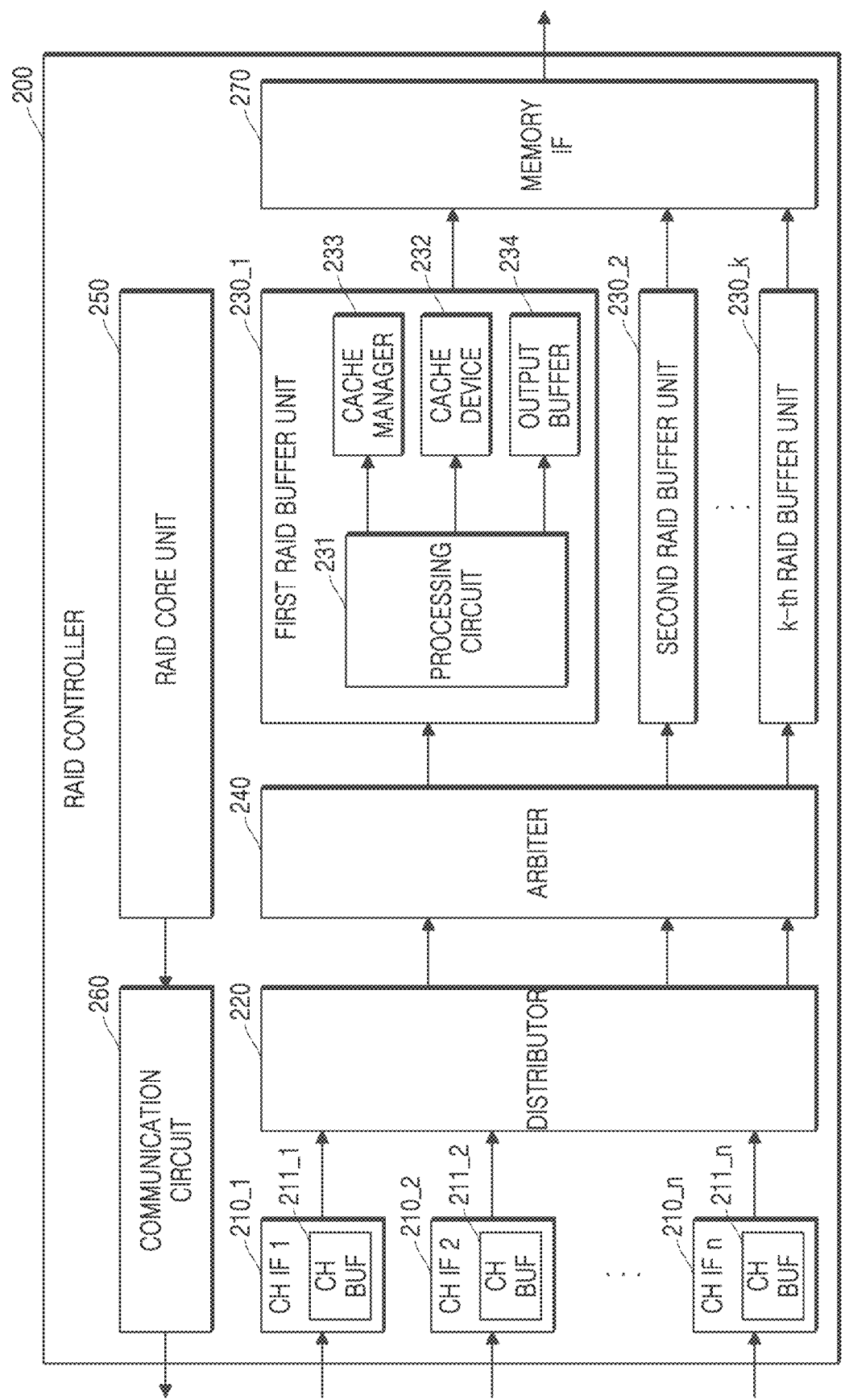
FIG. 2 is a block diagram illustrating a RAID controller according to some example embodiments.

FIG. 2 is a block diagram illustrating a RAID controller according to some example embodiments.

Referring to FIG. 2, the RAID controller 200 according to some example embodiments may include a plurality of channel interfaces 210_1 to 210_n (n is a natural number of 2 or more), a distributor 220, and a plurality of RAID buffer units 230_1 to 230_k (k is a natural number of 2 or more). In addition, the RAID controller 200 according to some example embodiments may further include an arbiter 240, a RAID core unit 250, a communication circuit 260, and a memory interface 270.

The plurality of channel interfaces 210_1 to 210_n may receive data strips distinguished by using a RAID identifier from each of the plurality of channels 150, split and store the data strips into a plurality of pieces of split data, and assign a split identifier to each of the plurality of pieces of split data.

The number of the plurality of channel interfaces 210_1 to 210_n may be the same as the number of the plurality of channels 150. For example, if the number of the plurality of channels 150 is n, the number of the plurality of channel interfaces 210_1 to 210_n may be n. In addition, each of the plurality of channel interfaces 210_1 to 210_n may be connected to each of the plurality of channels 150. For example, the m-th channel interface 210_m (m is a natural number equal to or greater than 1 and equal to or less than n) may be connected to the m-th channel.

The plurality of channel interfaces 210_1 to 210_n may receive data strips from the processor 100 through the plurality of channels 150. For example, the m-th channel interface 210_m may receive a data strip from the processor 100 through the m-th channel. In this case, the plurality of channel interfaces 210_1 to 210_n may receive RAID identifiers corresponding to the data strips together with the data strips. Accordingly, the data strips may be distinguished using the RAID identifiers.

The plurality of channel interfaces 210_1 to 210_n may split the received data strips into the plurality of pieces of split data. In this case, each of the plurality of pieces of split data may have the same capacity. In addition, how many pieces of split data the plurality of channel interfaces 210_1 to 210_n split the data strips into may be adjusted according to embodiments. For example, the plurality of channel interfaces 210_1 to 210_n may split data strips each having a capacity of 4 KB into eight pieces of split data having a capacity of 512 B.

The plurality of channel interfaces 210_1 to 210_n each may store the plurality of pieces of split data obtained by dividing a data strip.

The plurality of channel interfaces 210_1 to 210_n may include a plurality of channel buffers 211_1 to 211_n, respectively. The plurality of channel buffers 211_1 to 211_n may temporarily store the plurality of pieces of split data. For example, the m-th channel interface 210_m may split a data strip to obtain a plurality of pieces of split data, and temporarily store the acquired plurality of pieces of split data in the m-th channel buffer 211_m.

Each of the plurality of channel buffers 211_1 to 211_n may have a limited storage capacity. In this case, when the storage capacity of the plurality of channel buffers 211_1 to 211_n is full, the plurality of channel buffers 211_1 to 211_n may not be able to store a plurality of pieces of split data additionally obtained from the plurality of channel interfaces 210_1 to 210_n. Therefore, as described later, the arbiter 240 may set a transmission time point of each of the plurality of pieces of split data based on a storage status of the plurality of channel buffers 211_1 to 211_n to prevent or reduce the occurrence of the plurality of channel buffers 211_1 to 211_n from being fully filled.

The plurality of channel interfaces 210_1 to 210_n may allocate a split identifier to each of the plurality of pieces of split data. The split identifier may be an identifier for distinguishing split data. The plurality of channel interfaces 210_1 to 210_n may assign different split identifiers to the plurality of pieces of split data generated by the same data strip.

In some example embodiments, the plurality of channel interfaces 210_1 to 210_n may assign a split identifier independent of a RAID identifier to each of the plurality of pieces of split data. For example, when a data strip is split into eight pieces of split data, the plurality of channel interfaces 210_1 to 210_n may assign 1 to 8 as a split identifier to each of the eight pieces of split data.

In some example embodiments, the plurality of channel interfaces 210_1 to 210_n may assign a split identifier based on a RAID identifier corresponding to a data strip including each of the plurality of pieces of split data. For example, when the plurality of channel interfaces 210_1 to 210_n split a data strip into eight pieces of split data, one of 11 to 18 may be assigned as a split identifier to each of the eight pieces of split data generated by dividing a data strip with a RAID identifier of 1, and one of 21 to 28 may be assigned as a split identifier to each of the eight pieces of split data generated by dividing a data strip with a RAID identifier of 2. As such, a split identifier may be assigned so that the number of tenth digit of the split identifier is the same as the RAID identifier, but some example embodiments are not limited thereto, and other methods capable of obtaining a RAID identifier from the split identifier may be applied.

The plurality of pieces of split data allocated with split identifiers by the plurality of channel interfaces 210_1 to 210_n may be transmitted to the distributor 220.

The distributor 220 may set transmission paths of the plurality of pieces of split data based on the split identifiers. The distributor 220 may set a transmission path of each of the plurality of pieces of split data to any one of the plurality of RAID buffer units 230_1 to 230_k based on the split identifier.

In some example embodiments, when a split identifier independent of the RAID identifier is assigned to each of the plurality of pieces of split data, the distributor 220 may set a transmission path of the plurality of pieces of split data based on the RAID identifier and the split identifier. That is, the distributor 220 may set a transmission path of each of the plurality of pieces of split data to any one of the plurality of RAID buffer units 230_1 to 230_k based on the RAID identifier and the split identifier.

The distributor 220 may set, as a same RAID buffer unit, a transmission path of split data in which both the RAID identifier and the split identifier are the same. In other words, split data having the same RAID identifier and the same split identifier may be transmitted to the same RAID buffer unit.

The distributor 220 may set a transmission path of the split data having the same RAID identifier but different split identifier to different RAID buffer units. In other words, split data with the same RAID identifier but different split identifiers may be transmitted to different RAID buffer units. Accordingly, split data generated by the data strip to which the same RAID identifier is assigned by the processor 100 may be transmitted to different RAID buffer units.

However, if the number of split data with the same RAID identifier but different split identifiers is greater than the number of available RAID buffer units, the transmission path of some of the split data with the same RAID identifier but different split identifiers may be set to the same RAID buffer unit.

In some example embodiments, when a split identifier is assigned based on a RAID identifier corresponding to a data strip including each of the plurality of pieces of split data, the distributor 220 may set transmission paths of the plurality of pieces of split data based on the split identifier. That is, the distributor 220 may set a transmission path of each of the plurality of pieces of split data to any one of the plurality of RAID buffer units 230_1 to 230_k based on only the split identifier. This is because the RAID identifier may be obtained from the split identifier.

In this case, the transmission to any one of the plurality of RAID buffer units 230_1 to 230_k through the distributor 220 of the split data stored in the plurality of channel buffers 211_1 to 211_n of the plurality of channel interfaces 210_1 to 210_n may be controlled by the arbiter 240.

The arbiter 240 may control transmission of the plurality of pieces of split data of the plurality of channel interfaces 210_1 to 210_n. The arbiter 240 may control transmission of split data stored in the plurality of channel buffers 211_1 to 211_*n* to any one of the plurality of RAID buffer units 230_1 to 230_*k*. For example, the arbiter 240 may use a handshake method to notify the plurality of channel buffers 211_1 to 211_*n* of the transmission time point of the plurality of pieces of split data to the plurality of RAID buffer units 230_1 to 230_*k*.

In some example embodiments, the arbiter 240 may set a transmission time point of each of the plurality of pieces of split data based on the storage status of the channel buffers 211_1 to 211_*n* included in each of the plurality of channel interfaces 210_1 to 210_*n*. The arbiter 240 may check the storage status of the plurality of channel buffers 211_1 to 211_*n*. The arbiter 240 may set the split data included in the channel buffer of the plurality of channel buffers 211_1 to 211_*n* to be transmitted to the RAID buffer unit in which the channel buffer has a ratio of a capacity of storing the split data to the total capacity which is a predetermined (or, alternatively, determined or desired) reference ratio (e.g., 80%) or more.

In some example embodiments, the arbiter 240 may set a transmission time point of each of the plurality of pieces of split data based on whether parity data with the same RAID identifier and the same split identifier as those of the split data stored in the channel buffers 211_1 to 211_*n* of each of the plurality of channel interfaces 210_1 to 210_*n* is stored in the cache memory included in the plurality of RAID buffer units 230_1 to 230_*k*.

The arbiter 240 may identify a RAID identifier and a split identifier of the split data stored in the plurality of channel buffers 211_1 to 211_*n*. The arbiter 240 may identify a RAID identifier and a split identifier of the parity data stored in the cache memory included in the plurality of RAID buffer units 230_1 to 230_*k*. In addition, the arbiter 240 may set the split data having the same RAID identifier and the same split identifier as those of the parity data stored in the cache memory to be first transmitted to the RAID buffer unit.

The plurality of RAID buffer units 230_1 to 230_*k* may receive split data through the distributor 220 and manage parity data corresponding to the split data.

Each of the plurality of RAID buffer units 230_1 to 230_*k* may include a processing circuit 231 and a cache device 232. In addition, each of the plurality of RAID buffer units 230_1 to 230_*k* may further include a cache manager 233 and an output buffer 234. For illustrative purposes, FIG. 2 shows only the first RAID buffer unit 230_1 including a processing circuit 231, a cache device 232, a cache manager 233, and an output buffer 234, however the second to k-th RAID buffer units 230_2 to 230_*k* may also include a processing circuit 231, a cache device 232, a cache manager 233, and an output buffer 234, etc. in the same manner.

The processing circuit 231 may process operations related to parity data. For example, when the processing circuit 231 receives split data from the plurality of channel buffers 211_1 to 211_*n*, the processing circuit 231 may transmit the split data to the cache device 232 so that parity data is calculated based on the received split data. In addition, the processing circuit 231 may output the completed parity data to the external volatile memory 400 through the output buffer 234 based on the completion information of the parity data through the cache device 232.

The cache device 232 may calculate parity data based on the split data and store the parity data.

The cache device 232 may calculate parity data based on whether parity data with the same RAID identifier and split identifier as those of the split data is stored in internal cache memory.

The cache device 232 may re-calculate the parity data based on the stored parity data and the split data when the parity data with the same RAID identifier and split identifier as those of the split data is stored. Conversely, the cache device 232 may calculate the split data as parity data when the parity data with the same RAID identifier and split identifier as those of the split data is not stored.

The cache device 232 may store the calculated parity data in an internal cache memory.

A more detailed structure and operation of the cache device 232 will be described later in more detail with reference to FIG. 3.

The cache manager 233 may generate completion information of parity data stored in the cache memory included in the cache device 232.

The completion information of the parity data may be information indicating whether the parity data is generated based on a preset (or, alternatively, determined or desired) number of pieces of split data. For example, when parity data should be generated based on a total of seven pieces of split data to be completed, the cache manager 233 may generate completion information indicating that parity data is incomplete if the parity data is currently generated based on less than seven pieces of split data. Conversely, when parity data should be generated based on a total of seven pieces of split data to be completed, the cache manager 233 may generate completion information indicating that parity data is complete if the parity data is currently generated based on seven pieces of split data.

When there is parity data in which the completion information indicates that the parity data is complete, the cache manager 233 may send a request to the processing circuit 231 to write the parity data to the external volatile memory 400. Accordingly, the processing circuit 231 may transmit the parity data in the completed state to the external volatile memory 400.

The output buffer 234 may temporarily store parity data to be read from the cache device 232 and written to the external volatile memory 400.

When receiving the parity data in the completed state from the cache device 232, the output buffer 234 may temporarily store the parity data in the completed state. The output buffer 234 may output temporarily stored parity data to the NOC 300 through the memory interface 270, and the NOC 300 may transmit the received parity data to the volatile memory 400.

The RAID core unit 250 may control the overall operation of the RAID controller 200 and store completion information of parity data corresponding to the plurality of pieces of split data.

The RAID core unit 250 may receive completion information of parity data generated from the cache manager 233 and may store the received completion information of the parity data. In response to a request from the external processor 100, the RAID core unit 250 may output the completion information of the parity data to the external processor 100 through the communication circuit 260.

When processing a preset (or, alternatively, determined or desired) type of data strips, the RAID core unit 250 may control one or more of the plurality of RAID buffer units 230_1 to 230_*k* to operate as volatile memory.

The preset (or, alternatively, determined or desired) type of data strips may be a type of data strips that does not degrade (or, for example, significantly degrade) the data processing speed through the RAID controller 200 although the preset (or, alternatively, determined or desired) type of data strips are not processed using all of the plurality of RAID buffer units 230_1 to 230_k. For example, a data strip for metadata may be included in a preset (or, alternatively, determined or desired) type of data strip.

When processing a preset (or, alternatively, determined or desired) type of data strips, the RAID core unit 250 may control one or more of the plurality of RAID buffer units 230_1 to 230_k to operate as volatile memory because the data processing speed does not decrease (or, for example, significantly decrease) although the preset (or, alternatively, determined or desired) type of data strips are not processed using all of the plurality of RAID buffer units 230_1 to 230_k. That is, the RAID core unit 250 may allow the external processor 100 to use one or more of the plurality of RAID buffer units 230_1 to 230_k as volatile memory. By using some of the plurality of RAID buffer units 230_1 to 230_k as volatile memory, the memory inside the RAID controller 200 may be improved and used more efficiently (for example, by using as many resources as possible at a given operating power level). As described above, there may be an effect of improving memory usage of the RAID controller 200. Alternatively, or additionally, as described above, because memory usage of the RAID controller 200 has been improved, there may be an effect of improving the controller 200 and volatile memory performance, and thus device performance, improved power consumption by improving power utilization, and the like.

When processing a preset (or, alternatively, determined or desired) type of data strips, the RAID core unit 250 may cut off power to one or more of the plurality of RAID buffer units 230_1 to 230_k. The RAID core unit 250 may physically cut off power to one or more of the plurality of RAID buffer units 230_1 to 230_k, or may logically cut off power thereto using a separate circuit. Through this, the RAID core unit 250 may change the states of the unused RAID buffer units from among the plurality of RAID buffer units 230_1 to 230_k into a standby state or a sleep state. In this case, the RAID core unit 250 may manage parity data corresponding to split data using the RAID buffer units used from among the plurality of RAID buffer units 230_1 to 230_k.

When processing a preset (or, alternatively, determined or desired) type of data strips, the RAID core unit 250 may cut off power to one or more of the plurality of RAID buffer units 230_1 to 230_k because the data processing speed does not decrease (or, for example, significantly degrade) although the preset (or, alternatively, determined or desired) type of data strips are not processed using all of the plurality of RAID buffer units 230_1 to 230_k. By cutting off power to some of the plurality of RAID buffer units 230_1 to 230_k, power consumption of the RAID controller 200 may be reduced. As described above, there may be an effect of reducing power consumption by reducing usage of RAID buffer units. Alternatively, or additionally, as described above, because a usage of the RAID buffer units has been prevented or reduced, there may be an effect of maintaining the buffer unit performance, and thus device performance, improving processing speed by avoiding performing redundant operations, improved power consumption by reduced operations, and the like.

The communication circuit 260 may transmit completion information of parity data to the external processor 100. In response to a request from the RAID core unit 250 to transmit the completion information of the parity data to the external processor 100, the communication circuit 260 may output the completion information of the parity data to the external processor 100.

The memory interface 270 may transmit, to the NOC 300, parity data output from the plurality of RAID buffer units 230_1 to 230_k.

When using the RAID controller 200 of the technical idea of this inventive concepts as described above, the complexity of the structure of the RAID controller 200 may be reduced by using the plurality of channel interfaces 210_1 to 210_n and the plurality of RAID buffer units 230_1 to 230_n. In addition, data strips may be processed more quickly by using the plurality of channel interfaces 210_1 to 210_n and the plurality of RAID buffer units 230_1 to 230_n and setting transmission time points of the plurality of pieces of split data through the arbiter 240. As described above, there may be an effect of reducing device complexity. Alternatively, or additionally, as described above, because of a reduction in device complexity, there may be an effect of improving reliability and power consumption, and the like.

Figure 3:
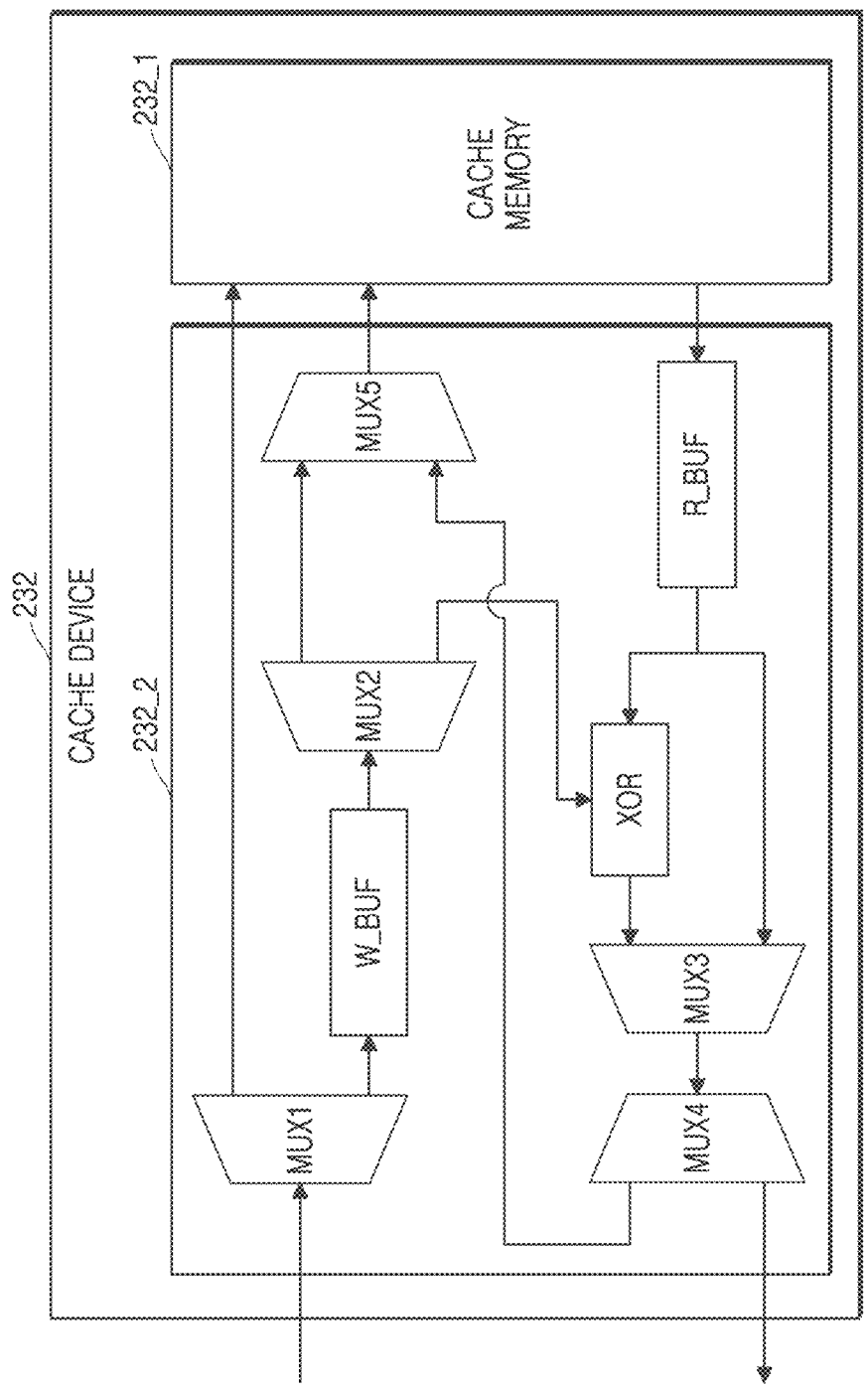
FIG. 3 is a circuit diagram illustrating a cache device according to some example embodiments.

FIG. 3 is a circuit diagram illustrating a cache device according to some example embodiments.

Referring to FIG. 3, a cache device 232 according to some example embodiments may include a cache memory 232_1 and a calculation circuit 232_2.

The cache memory 232_1 may store parity data. The cache memory 232_1 may store parity data calculated through the calculation circuit 232_2 of the cache device 232 as the split data is received from the processing circuit 231.

The calculation circuit 232_2 may calculate parity data based on the split data and the parity data read from the cache memory 231-1. The calculation circuit 232_2 may include first to fifth multiplexers MUX1 to MUX5, a write buffer W_BUF, a read buffer R_BUF, and a logic circuit XOR.

The first multiplexer MUX1 may receive split data. Upon receiving the split data, the first multiplexer MUX1 may output, to the cache memory 232_1, a read request for parity data with the same RAID identifier and the same split identifier as those of the split data. In addition, the first multiplexer MUX1 may output the split data to the write buffer W_BUF.

The write buffer W_BUF may temporarily store the received split data. The write buffer W_BUF may output the split data to the second multiplexer MUX2 after a predetermined (or, alternatively, determined or desired) time elapses.

The second multiplexer MUX2 may receive split data from the write buffer W_BUF. The second multiplexer MUX2 may output split data to the fifth multiplexer MUX5. In addition, the second multiplexer MUX2 may output split data to the logic circuit XOR.

The read buffer R_BUF may temporarily store parity data read from the cache memory 232_1. The read buffer R_BUF may output parity data to the logic circuit XOR after a predetermined (or, alternatively, determined or desired) time elapses.

The logic circuit XOR may re-calculate parity data based on split data temporarily stored in the write buffer W_BUF and parity data temporarily stored in the read buffer R_BUF. For example, the logic circuit XOR may re-calculate parity data by performing an XOR operation between split data temporarily stored in the write buffer W_BUF and parity data temporarily stored in the read buffer R_BUF.

The logic circuit XOR may output the re-calculated parity data to the third multiplexer MUX3.

The third multiplexer MUX3 may receive parity data re-calculated by the logic circuit XOR and parity data read from the cache memory 232_1. In addition, the third multiplexer MUX3 may selectively output, to the fourth multiplexer MUX4, one of the parity data re-calculated by the logic circuit XOR and the parity data read from the cache memory 232_1. For example, when parity data is normally calculated, the third multiplexer MUX3 may output parity data re-calculated by the logic circuit XOR to the fourth multiplexer MUX4. Conversely, when parity data is abnormally calculated, the third multiplexer MUX3 may output parity data read from the cache memory 232_1 to the fourth multiplexer MUX4.

The fourth multiplexer MUX4 may receive parity data from the third multiplexer MUX3. The fourth multiplexer MUX4 may output the received parity data to the processing circuit 231. In addition, the fourth multiplexer MUX4 may output the received parity data to the fifth multiplexer MUX5.

The fifth multiplexer MUX5 may receive split data from the write buffer W_BUF, through the second multiplexer MUX2. In addition, the fifth multiplexer MUX5 may receive parity data from the fourth multiplexer MUX4.

The fifth multiplexer MUX5 may output the split data to the cache memory 232_1 if the parity data with the same RAID identifier and split identifier as those of the split data is not stored in the cache memory 232_1. Accordingly, if the parity data with the same RAID identifier and split identifier as those of the split data is not stored in the cache memory 232_1, the split data may be stored in the cache memory 232_1 as parity data.

The fifth multiplexer MUX5 may output the parity data to the cache memory 232_1 if the parity data with the same RAID identifier and split identifier as those of the split data is stored in the cache memory 232_1. Accordingly, if the parity data with the same RAID identifier and split identifier as those of the split data is stored in the cache memory 232_1, the re-calculated parity data may be stored in the cache memory 232_1 as new parity data.

Here, the cache device 232 may calculate parity data in a pipeline method using the first to fifth multiplexers MUX1 to MUX5, the write buffer W_BUF, the read buffer R_BUF, and the logic circuit XOR. This may be described in more detail with reference to FIG. 4.

Figure 4:
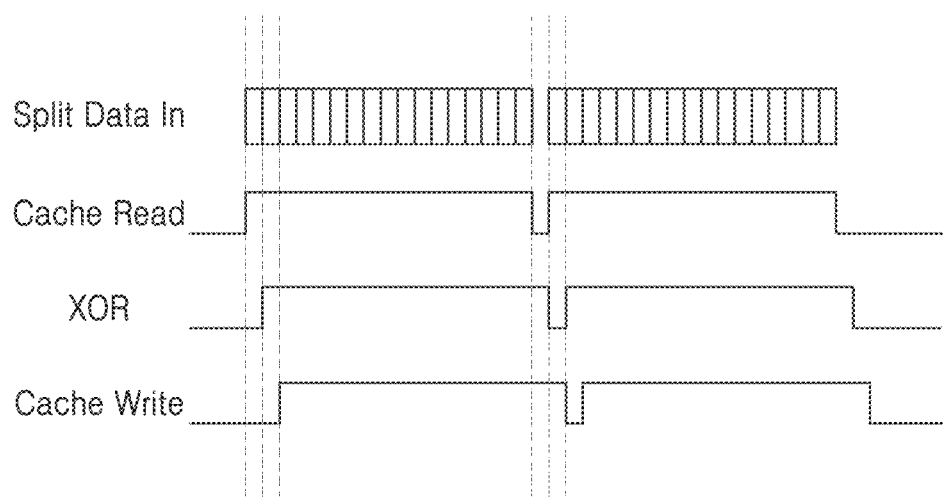
FIG. 4 is a timing diagram illustrating a parity operation process of a cache device according to some example embodiments.

FIG. 4 is a timing diagram illustrating a parity operation process of a cache device according to some example embodiments.

Referring to FIG. 4, it is possible to check the timing diagram showing the time point when split data is inputted to the cache device 232, the time point when parity data is read from the cache memory 232_1, the time point when parity data is calculated through the logic circuit XOR, and the time point when parity data is written to the cache memory 232_1.

As the split data is input, parity data with the same RAID identifier and split identifier as those of the split data may be read from the cache memory 232_1. The logic circuit XOR may then re-calculate parity data based on split data temporarily stored in the write buffer W_BUF and parity data temporarily stored in the read buffer R_BUF. Finally, the re-calculated parity data may be stored in the cache memory 232_1.

Here, since the cache device 232 calculates parity data in a pipeline method, the operation of reading parity data from the cache memory 232_1, the operation of calculating parity data through the logic circuit XOR, and the operation of writing parity data to the cache memory 232_1 may be performed at the same time point. Accordingly, the data processing performance of the cache device 232 may be improved and/or performed more quickly.

Figure 5:
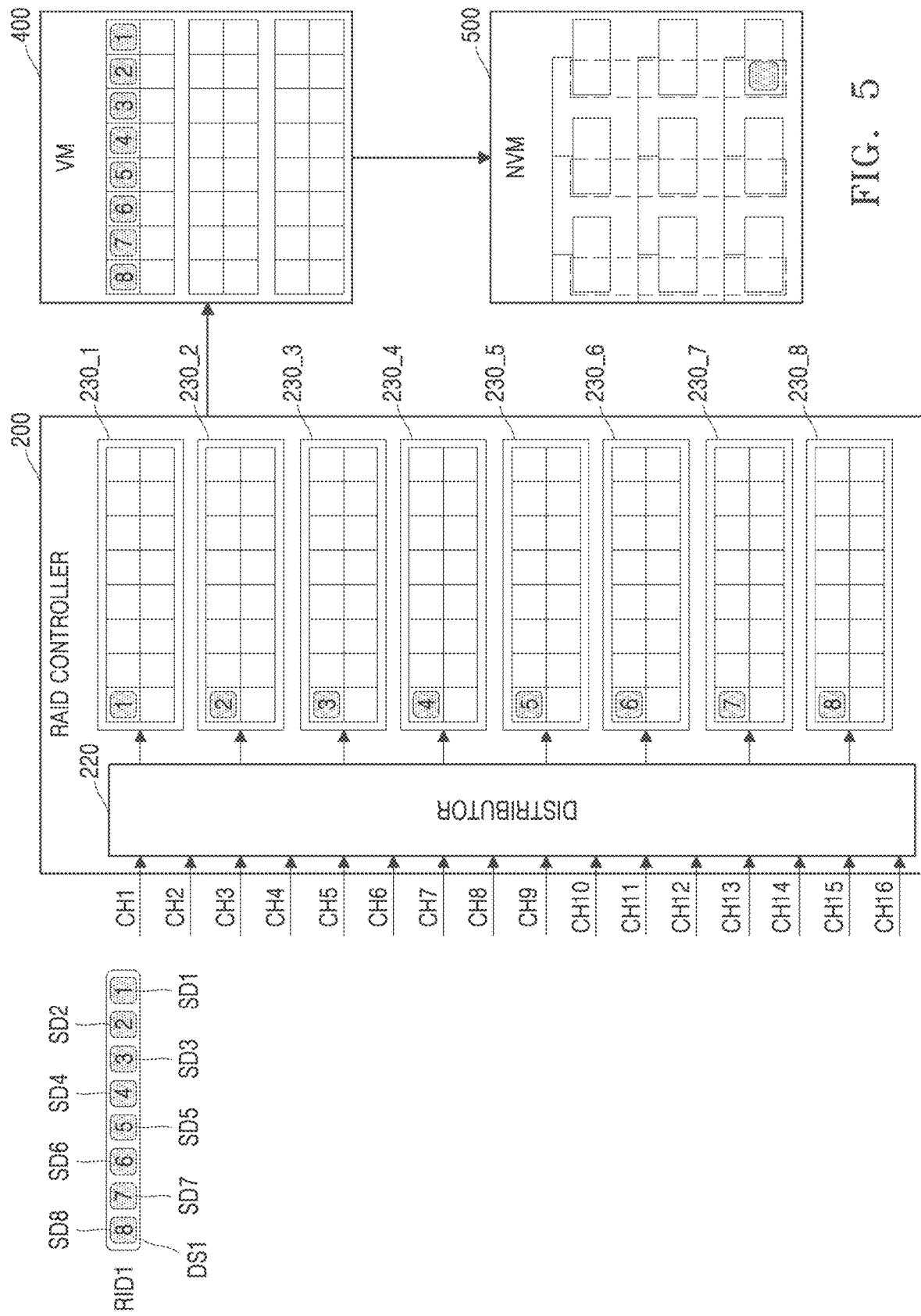
FIG. 5 is a diagram illustrating a process in which a storage device processes one data strip, according to some example embodiments.

FIG. 5 is a diagram illustrating a process in which a storage device processes one data strip according to some example embodiments.

Referring to FIG. 5, it is possible to check some example embodiments of a process in which parity data is generated and written to the volatile memory 400 and the non-volatile memory 500, after first data strip DS1 is input to the RAID controller 200.

The first data strip DS1 may be a data strip in which 1 is allocated by the processor 100 as a RAID identifier RID.

The first data strip DS1 may be input to the RAID controller 200 through any one of the first to sixteenth channels CH1 to CH16, for example, may be input to the RAID controller 200 through the first channel CH1. When the first data strip DS1 is input through the first channel CH1, the first channel interface 210_1 may receive the same.

The first channel interface 210_1 may split the received first data strip DS1 into a plurality of split data, for example, first to eighth split data SD1 to SD8. In this case, the first channel interface 210_1 may assign a split identifier independent of the RAID identifier RID to each of the first to eighth split data SD1 to SD8, for example, may assign 1 to 8 as a split identifier to each of the first to eighth split data SD1 to SD8.

In the first to eighth split data SD1 to SD8 generated based on the first data strip DS1, any one of the first to eighth RAID buffer units 230_1 to 230_8 may be set as a transmission path by the distributor 220. For example, the distributor 220 may set the transmission path of the first split data SD1 to be the first RAID buffer unit 230_1, the transmission path of the second split data SD2 to be the second RAID buffer unit 230_2, and the transmission path of the eighth split data SD8 to be the eighth RAID buffer unit 230_8.

In this case, transmission time points of the first to eighth split data SD1 to SD8 may be adjusted by the arbiter 240.

Each of the first to eighth RAID buffer units 230_1 to 230_8 may generate first to eighth parity data based on the received first to eighth split data SD1 to SD8. When the first to eighth parity data are completed, the first to eighth RAID buffer units 230_1 to 230_8 may write the first to eighth parity data in one region of the volatile memory 400.

The first to eighth parity data written in one region of the volatile memory 400 may be written in one region of the non-volatile memory 500. In this case, in the first to eighth parity data, the data strip to which the same RAID identifier RID is assigned may be written in a page at the same position in the plurality of flash memory chips included in the non-volatile memory 500.

Figure 6:
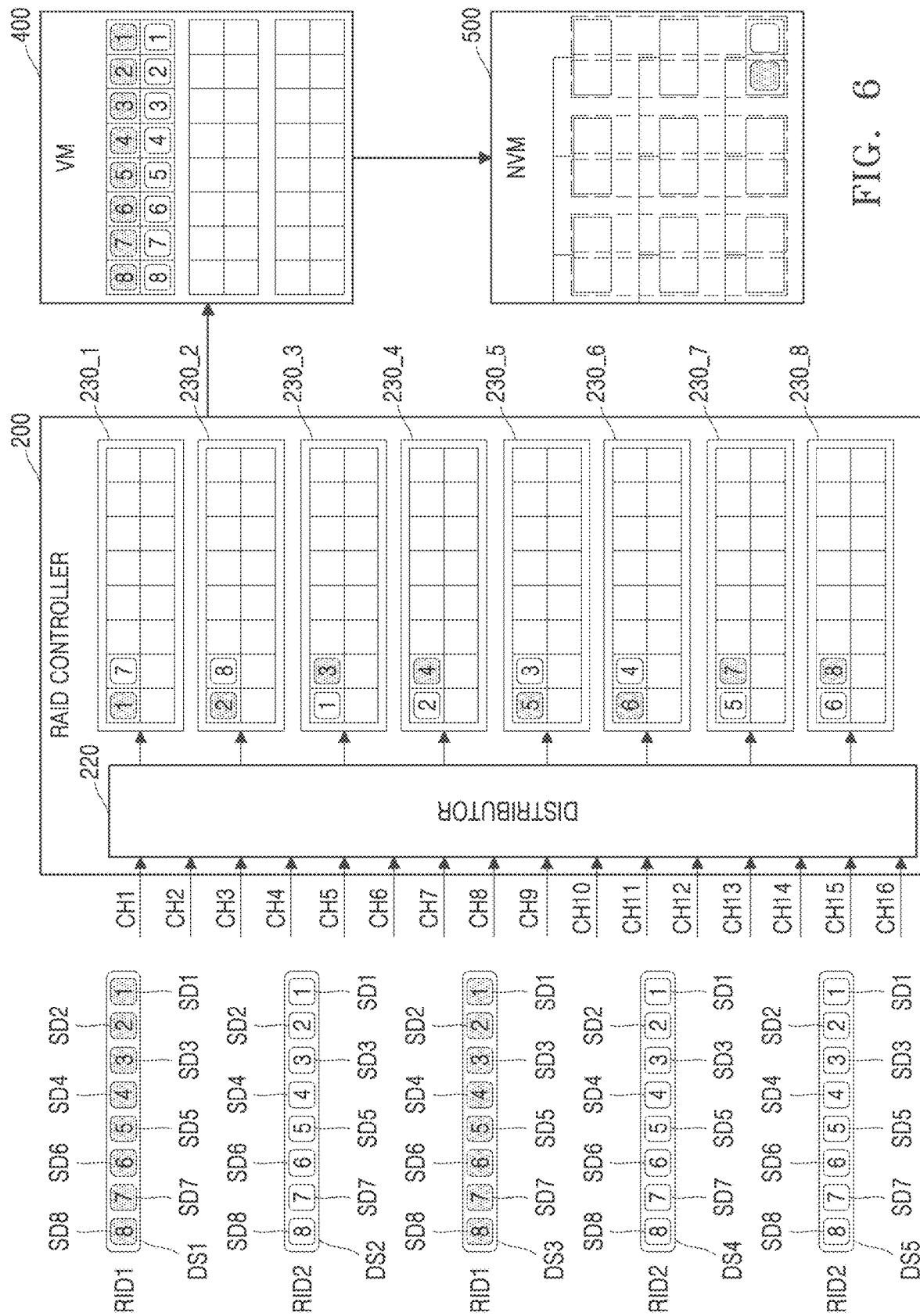
FIG. 6 is a diagram illustrating a process in which a storage device processes a plurality of data strips, according to some example embodiments.

FIG. 6 is a diagram illustrating a process in which a storage device processes a plurality of data strips according to some example embodiments.

Referring to FIG. 6, it is possible to check some example embodiments of a process in which, after the first data strip DS1 to the fifth data strip DS5 are input to the RAID controller 200, parity data is generated and written to the volatile memory 400 and the nonvolatile memory.

The first data strip DS1 and the third data strip DS3 may be data strips in which 1 is assigned to the RAID identifier RID by the processor 100, and the second data strip DS2, the fourth data strip DS4, and the fifth data strip DS5 may be data strips in which 2 is assigned to the RAID identifier RID by the processor 100.

The first data strip DS1 to the fifth data strip DS5 may be input to the RAID controller 200 through any one of the first to sixteenth channels CH1 to CH16. For example, the first data strip DS1 is input to the RAID controller 200 through the first channel CH1, the second data strip DS2 is input to the RAID controller 200 through the fourth channel CH4, the third data strip DS3 is input to the RAID controller 200 through the eighth channel CH8, the fourth data strip DS4 is input to the RAID controller 200 through the eleventh channel CH11, and the fifth data strip DS5 may be input to the RAID controller 200 through the fifteenth channel CH15.

When the first data strip DS1 is input through the first channel CH1, the first channel interface 210_1 may receive the input. When the second data strip DS2 is input through the fourth channel CH4, the fourth channel interface 210_4 may receive the second data strip DS2. When the third data strip DS3 is input through the eighth channel CH8, the eighth channel interface 210_8 may receive the input. When the fourth data strip DS4 is input through the eleventh channel CH11, the eleventh channel interface 210_11 may receive the input.

The first channel interface 210_1 may split the received first data strip DS1 into a plurality of split data, for example, first to eighth split data SD1 to SD8. In addition, the first channel interface 210_1 may assign 1 to 8 as a split identifier to each of the first to eighth split data SD1 to SD8 generated based on the first data strip DS1.

In addition, the fifth channel interface 210_5 may split the received second data strip DS2 into a plurality of split data, for example, first to eighth split data SD1 to SD8. In addition, the fifth channel interface 210_5 may assign 1 to 8 as a split identifier to each of the first to eighth split data SD1 to SD8 generated based on the second data strip DS2.

In the same manner, the eighth channel interface 210_8, the eleventh channel interface 210_11, and the fifteenth channel interface 210_15 may split the third data strip DS3, the fourth data strip DS4, and the fifth data strip DS5 into first to eighth split data SD1 to SD8, respectively, and may assign 1 to 8 to the first to eighth split data SD1 to SD8, respectively as a split identifier.

The distributor 220 may set any one of the first to eighth RAID buffer units 230_1 to 230_8 as a transmission path based on the RAID identifier and the split identifier in the case of the first to eighth split data SD1 to SD8 generated based on the first to fifth data strips DS1 to DS5.

In the first to eighth split data SD1 to SD8 generated based on the first data strip DS1, any one of the first to eighth RAID buffer units 230_1 to 230_8 may be set as a transmission path by the distributor 220. For example, the distributor 220 may set the transmission path of the first split data SD1 to be the first RAID buffer unit 230_1, the transmission path of the second split data SD2 to be the second RAID buffer unit 230_2, and the transmission path of the eighth split data SD8 to be the eighth RAID buffer unit 230_8.

In addition, in the first to eighth split data SD1 to SD8 generated based on the second data strip DS2, any one of the first to eighth RAID buffer units 230_1 to 230_8 may be set as a transmission path by the distributor 220. For example, the distributor 220 may set the transmission path of the first split data SD1 to be the third RAID buffer unit 230_3, the transmission path of the second split data SD2 to be the fourth RAID buffer unit 230_4, and the transmission path of the eighth split data SD8 to be the second RAID buffer unit 230_2.

In this case, the first split data SD1 generated based on the first data strip DS1 and the first split data SD1 generated based on the second data strip DS2 have different RAID identifiers even if they have the same split identifier, so they may be transmitted to different RAID buffer units.

In the first to eighth split data SD1 to SD8 generated based on the third data strip DS3, any one of the first to eighth RAID buffer units 230_1 to 230_8 may be set as a transmission path by the distributor 220. For example, the distributor 220 may set the transmission path of the first split data SD1 to be the first RAID buffer unit 230_1, the transmission path of the second split data SD2 to be the second RAID buffer unit 230_2, and the transmission path of the eighth split data SD8 to be the eighth RAID buffer unit 230_8.

In this case, the first split data SD1 generated based on the first data strip DS1 and the first split data SD1 generated based on the third data strip DS3 have the same RAID identifier and the same split identifier, so they may be transmitted to the same RAID buffer unit.

In the first to eighth split data SD1 to SD8 generated based on the fourth data strip DS4, any one of the first to eighth RAID buffer units 230_1 to 230_8 may be set as a transmission path by the distributor 220. For example, the distributor 220 may set the transmission path of the first split data SD1 to be the third RAID buffer unit 230_3, the transmission path of the second split data SD2 to be the fourth RAID buffer unit 230_4, and the transmission path of the eighth split data SD8 to be the second RAID buffer unit 230_2.

In this case, the first split data SD1 generated based on the second data strip DS2 and the first split data SD1 generated based on the fourth data strip DS4 have the same RAID identifier and the same split identifier, so they may be transmitted to the same RAID buffer unit.

In addition, in the first to eighth split data SD1 to SD8 generated based on the fifth data strip DS5, any one of the first to eighth RAID buffer units 230_1 to 230_8 may be set as a transmission path by the distributor 220. For example, the distributor 220 may set the transmission path of the first split data SD1 to be the third RAID buffer unit 230_3, the transmission path of the second split data SD2 to be the fourth RAID buffer unit 230_4, and the transmission path of the eighth split data SD8 to be the second RAID buffer unit 230_2.

In this case, the first split data SD1 generated based on the second data strip DS2 and the first split data SD1 generated based on the fifth data strip DS5 have the same RAID identifier and the same split identifier, so they may be transmitted to the same RAID buffer unit.

In this case, the transmission time points of the first to eighth split data SD1 to SD8 generated based on the first to fifth data strips DS1 to DS5 may be adjusted by the arbiter 240.

Each of the first to eighth RAID buffer units 230_1 to 230_8 may generate parity data based on the received split data. In addition, when the parity data is completed, the first to eighth RAID buffer units 230_1 to 230_8 may write the parity data in one region of the volatile memory 400.

The parity data written in one region of the volatile memory 400 may be written in one region of the non-volatile memory 500. In this case, in the first to eighth parity data, the data strip to which the same RAID identifier is assigned may be written in a page at the same position in the plurality of flash memory chips included in the non-volatile memory 500.

Figure 7:
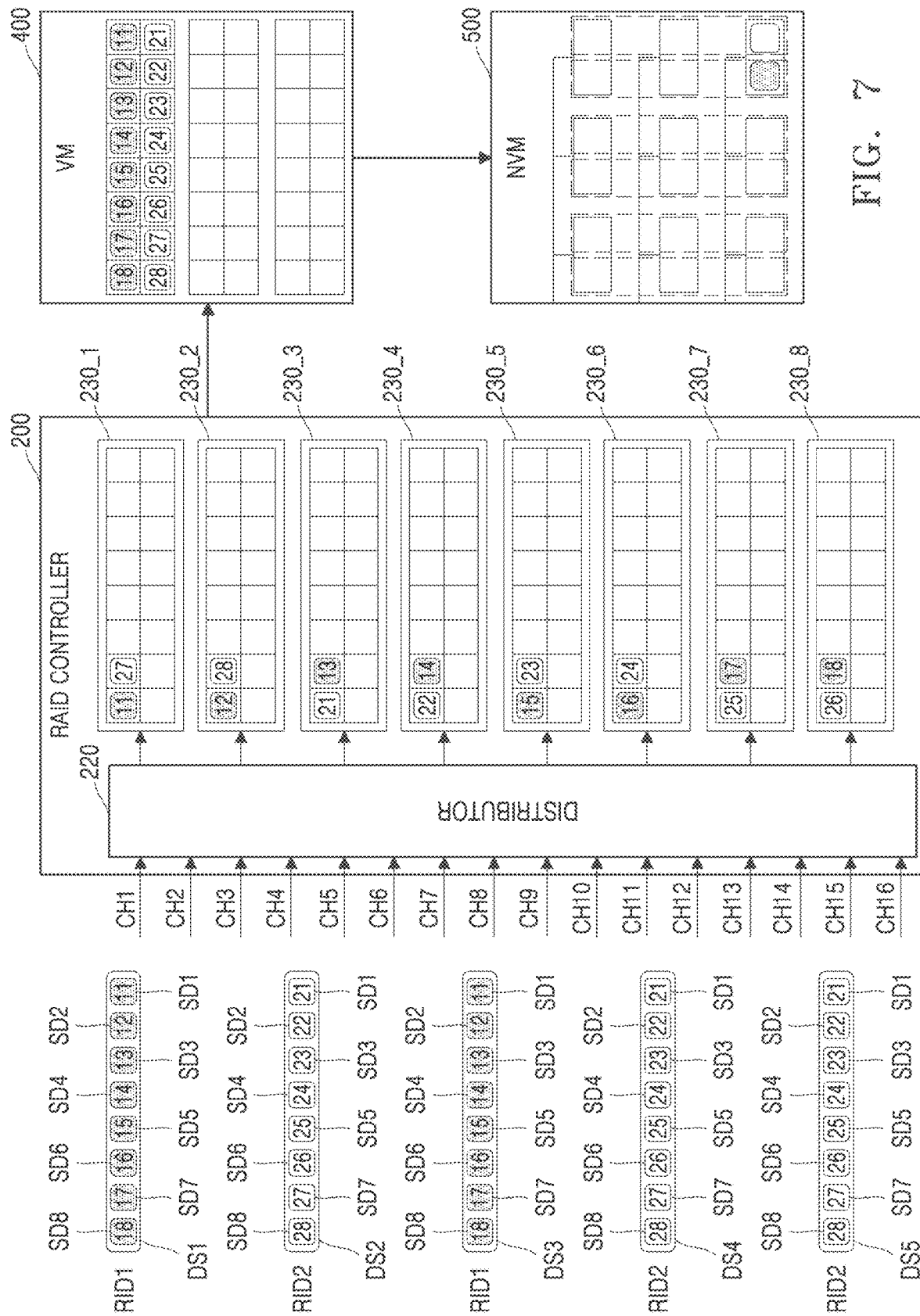
FIG. 7 is a diagram illustrating a process in which a storage device according to some example embodiments allocates a split identifier on the basis of a RAID identifier to process a plurality of data strips.

FIG. 7 is a diagram illustrating a process in which a storage device according to some example embodiments allocates a split identifier based on a RAID identifier to process a plurality of data strips.

Referring to FIG. 7, it is possible to check some example embodiments of a process in which, after the first data strip DS1 to the fifth data strip DS5 are input to the RAID controller 200, parity data is generated and written to the volatile memory 400 and the nonvolatile memory.

In some example embodiments of FIG. 7, the overall operation may be similar to some example embodiments of FIG. 6, but a method of allocating a split identifier by the plurality of channel interfaces 210_1 to 210_16 may be different.

In some example embodiments of FIG. 7, the plurality of channel interfaces 210_1 to 210_16, unlike some example embodiments of FIG. 6, may assign a split identifier to the split data based on the RAID identifier RID.

The first channel interface 210_1 may split the received first data strip DS1 into first to eighth split data SD1 to SD8. The first channel interface 210_1 may assign 11 to 18 as a split identifier to each of the first to eighth split data SD1 to SD8 generated based on the first data strip DS1. In this case, 1 which is a decimal number of the split identifier may correspond to the RAID identifier RID.

The fifth channel interface 210_5 may split the received second data strip DS2 into first to eighth split data SD1 to SD8. The fifth channel interface 210_5 may assign 21 to 28 as a split identifier to each of the first to eighth split data SD1 to SD8 generated based on the second data strip DS2. In this case, 2 which is a decimal number of the split identifier may correspond to the RAID identifier RID.

The eighth channel interface 210_8 may split the received third data strip DS3 into first to eighth split data SD1 to SD8. The eighth channel interface 210_8 may assign 11 to 18 as a split identifier to each of the first to eighth split data SD1 to SD8 generated based on the third data strip DS3. In this case, 1 which is a decimal number of the split identifier may correspond to the RAID identifier RID.

In this case, the first to eighth split data SD1 to SD8 generated through the eighth channel interface 210_8 is generated based on a data strip having the same RAID identifier RID as that of the first to eighth split data SD1 to SD8 generated through the first channel interface 210_1, and thus have the same split identifier.

The eleventh channel interface 210_11 may split the received fourth data strip DS4 into first to eighth split data SD1 to SD8. The eleventh channel interface 210_11 may assign 21 to 28 as a split identifier to each of the first to eighth split data SD1 to SD8 generated based on the fourth data strip DS4. In this case, 2 which is a decimal number of the split identifier may correspond to the RAID identifier RID.

In this case, the first to eighth split data SD1 to SD8 generated through the eleventh channel interface 210_11 is generated based on a data strip having the same RAID identifier RID as that of the first to eighth split data SD1 to SD8 generated through the fifth channel interface 210_5, and thus have the same split identifier.

The fifteenth channel interface 210_15 may split the received fifth data strip DS5 into first to eighth split data SD1 to SD8. The fifteenth channel interface 210_15 may assign 21 to 28 as a split identifier to each of the first to eighth split data SD1 to SD8 generated based on the fifth data strip DS5. In this case, 2 which is a decimal number of the split identifier may correspond to the RAID identifier RID.

In this case, the first to eighth split data SD1 to SD8 generated through the fifteenth channel interface 210_15 is generated based on a data strip having the same RAID identifier RID as that of the first to eighth split data SD1 to SD8 generated through the fifth channel interface 210_5, and thus have the same split identifier.

The distributor 220 may set any one of the first to eighth RAID buffer units 230_1 to 230_8 as a transmission path based on the split identifier in the case of the first to eighth split data SD1 to SD8 generated based on the first to fifth data strips DS1 to DS5. In some example embodiments of FIG. 7, since a split identifier is assigned based on a RAID identifier, the distributor 220 may set the transmission path of each of the plurality of split data to be any one of the plurality of RAID buffer units 230_1 to 230_8.

Figure 8:
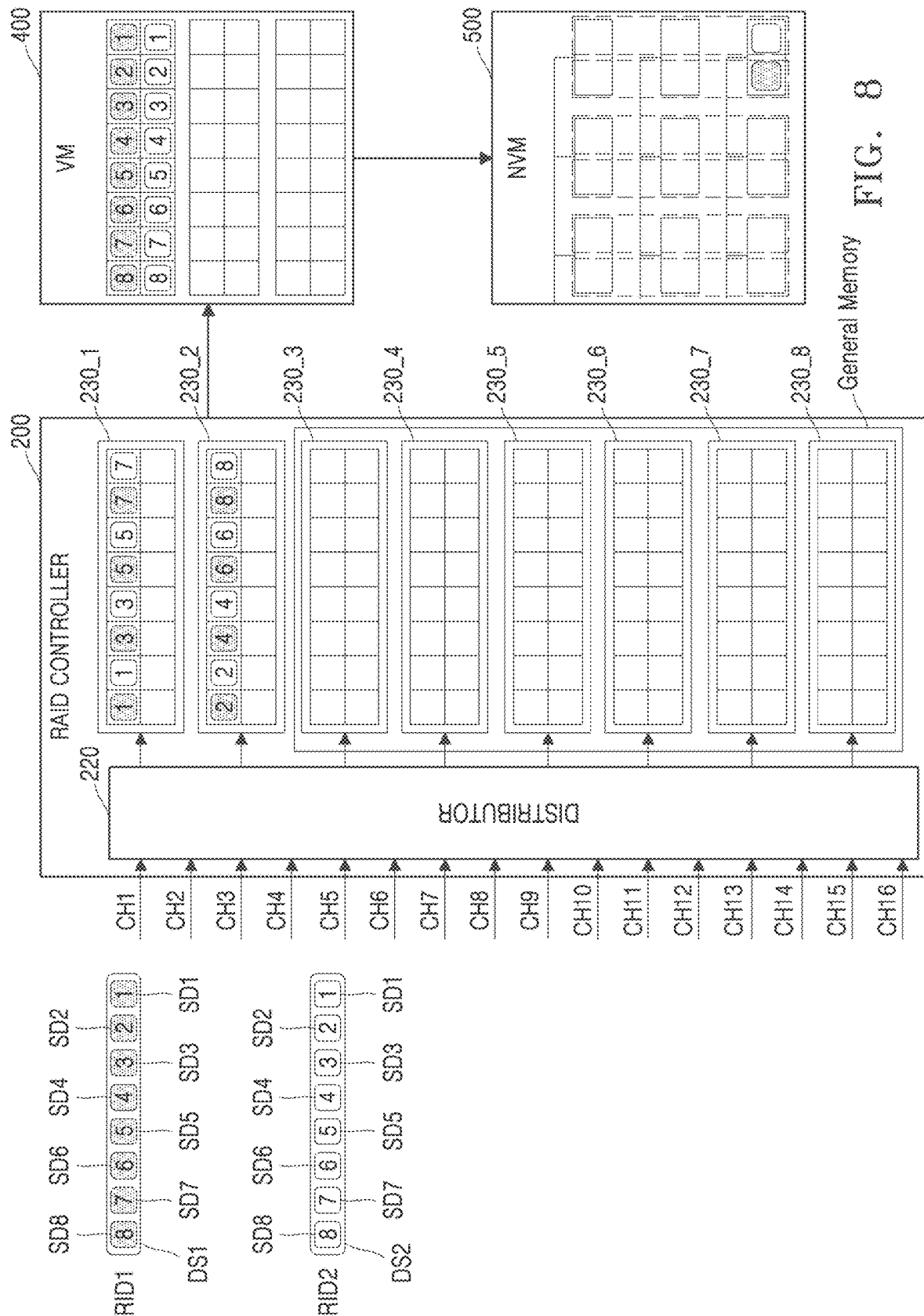
FIG. 8 is a diagram illustrating a process in which a storage device according to some example embodiments processes two data strips using some RAID buffer units.

FIG. 8 is a diagram illustrating a process in which a storage device according to some example embodiments processes two data strips using some RAID buffer units.

Referring to FIG. 8, it is possible to check some example embodiments in which two data strips processed by the storage device are data strips related to metadata. In this case, the RAID core unit 250 may process the data strip at a similar processing speed without using all of the first to eighth RAID buffer units 230_1 to 230_8, so only the first and second RAID buffer units 230_1 and 230_2 may be used. In this case, the third to eighth RAID buffer units 230_3 to 230_8 that are not used may be set to be used by the external processor 100 as volatile memory or power may be cut off thereto.

In this case, the overall data processing method is similar to some example embodiments of FIG. 6, but only the transmission paths of the first to eighth split data SD1 to SD8 generated based on the first data strip DS1 and the first to eighth split data SD1 to SD8 generated based on the second data strip DS2 through the distributor 220 may be different.

In the first to eighth split data SD1 to SD8 generated based on the first data strip DS1, any one of the first and second RAID buffer units 230_1 and 230_2 may be set as a transmission path by the distributor 220. In addition, in the first to eighth split data SD1 to SD8 generated based on the second data strip DS2, any one of the first and second RAID buffer units 230_1 and 230_2 may be set as a transmission path by the distributor 220. For example, the distributor 220 may set the transmission paths of the first split data SD1, the third split data SD3, the fifth split data SD5, and the seventh split data SD7 generated based on the first data strip DS1 and the second data strip DS2 to be the first RAID buffer unit 230_1, and may set the transmission paths of the second split data SD2, the fourth split data SD4, the sixth split data SD6, and the eighth split data SD8 generated based on the first data strip DS1 and the second data strip DS2 to be the second RAID buffer unit 230_2.

The first and second RAID buffer units 230_1 to 230_2 may generate parity data based on the received split data. In addition, when the parity data is completed, the first and second RAID buffer units 230_1 and 230_2 may write the parity data in one region of the volatile memory 400.

The parity data written in one region of the volatile memory 400 may be written in one region of the non-volatile memory 500.

Figure 9:
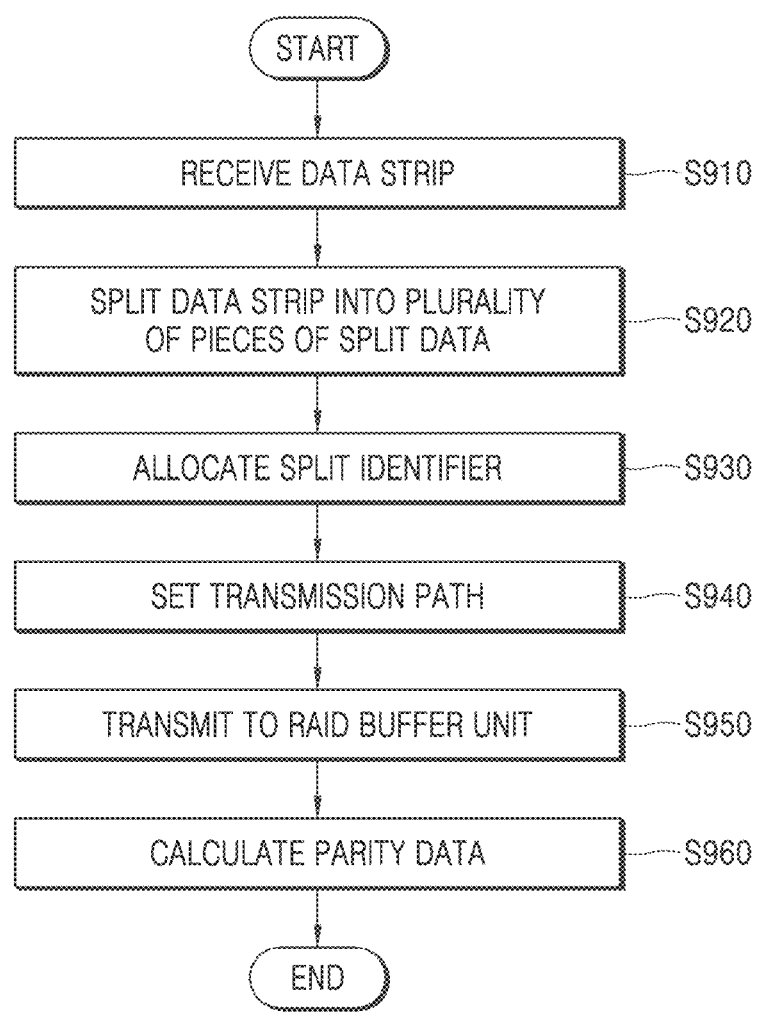
FIG. 9 is a flowchart illustrating an operating method of a RAID controller, according to some example embodiments.

FIG. 9 is a flowchart illustrating a method of operating a RAID controller according to some example embodiments.

Referring to FIG. 9, in operation S910, the RAID controller 200 may receive data strips. The RAID controller 200 may receive, through the plurality of channel interfaces 210_1 to 210_n, data strips transmitted via the plurality of channels 150 from the processor 100.

In operation S920, the RAID controller 200 may split each of the data strips into a plurality of pieces of split data. The RAID controller 200 may split each of the data strips into the plurality of pieces of split data through the plurality of channel interfaces 210_1 to 210_n.

In operation S930, the RAID controller 200 may allocate a split identifier to each of the plurality of pieces of split data. The RAID controller 200 may assign different split identifiers to a plurality of pieces of split data generated by the same data strip through a plurality of channel interfaces 210_1 to 210_n, respectively.

In operation S940, the RAID controller 200 may set a transmission path of each of the plurality of pieces of split data. The RAID controller 200 may set a transmission path of each of the plurality of pieces of split data based on the split identifier through the distributor 220.

In operation S950, the RAID controller 200 may transmit the plurality of pieces of split data to the plurality of RAID buffer units 230_1 to 230_k, respectively. The RAID controller 200 may transmit a plurality of pieces of split data to the plurality of RAID buffer units 230_1 to 230_k based on the transmission time point adjusted by the arbiter 240. This will be described later in more detail with reference to FIG. 10.

In operation S960, the RAID controller 200 may calculate a plurality of pieces of parity data respectively corresponding to the plurality of pieces of split data. The RAID controller 200 may calculate parity data through the plurality of RAID buffer units 230_1 to 230_k based on whether parity data with the same RAID identifier and split identifier as those of the split data is stored in internal cache memory. This will be described later in more detail with reference to FIG. 11.

Figure 10:
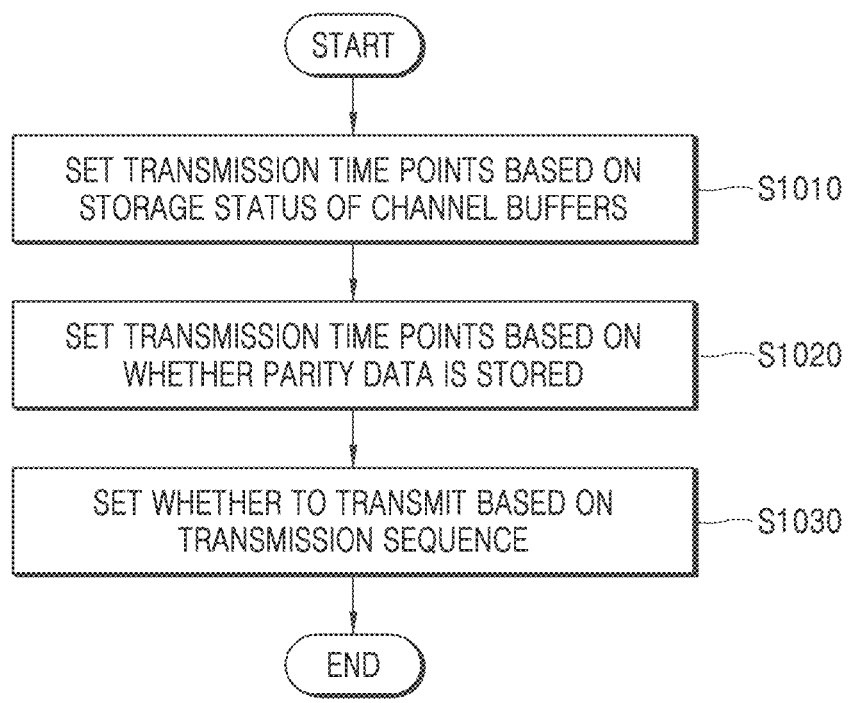
FIG. 10 is a flowchart illustrating a method of setting a transmission time point of split data, by an arbiter of a RAID controller, according to some example embodiments.

FIG. 10 is a flowchart illustrating a method of setting a transmission time point of split data by an arbiter of a RAID controller according to some example embodiments.

Referring to FIG. 10, in operation S1010, the arbiter 240 may set a transmission time point of each of the plurality of split data based on the storage status of the channel buffers 211_1 to 211_n.

The arbiter 240 may set the split data included in the channel buffer of the plurality of channel buffers 211_1 to 211_n to be transmitted to the RAID buffer unit in which the channel buffer has a ratio of a capacity of storing the split data to the total capacity which is a predetermined (or, alternatively, determined or desired) reference ratio or more. Then, the arbiter 240 may set the split data included in the channel buffer of the plurality of channel buffers 211_1 to 211_n to be transmitted to the RAID buffer unit later, in which the channel buffer has a ratio of a capacity of storing the split data to the total capacity, which is less than a predetermined (or, alternatively, determined or desired) reference ratio.

In operation S1020, the arbiter 240 may set a transmission time point of each of the plurality of pieces of split data based on whether parity data is stored.

The arbiter 240 may set transmission time points between the pieces of split data set to be transmitted at the same time point as a result of setting in operation S1010. For example, the arbiter 240 may set a transmission time point between the pieces of split data included in the channel buffer in which the ratio of the capacity storing the split data to the total capacity is less than a preset (or, alternatively, determined or desired) reference ratio.

The arbiter 240 may set the split data having the same RAID identifier and the same split identifier as those of the parity data stored in the cache memory to be first transmitted to the RAID buffer unit. In addition, the arbiter 240 may set the split data which does not have the same RAID identifier and the same split identifier as those of the parity data stored in the cache memory to be transmitted to the RAID buffer unit later.

In operation S1030, the arbiter 240 may set a transmission time point based on a transmission sequence.

The arbiter 240 may set transmission time points between the pieces of split data set to be transmitted at the same time point as a result of setting in operation S1020. For example, the arbiter 240 may set a transmission time point between parity data stored in cache memory and split data that does not have the same RAID identifier and the same split identifier, if a ratio of the capacity storing split data to the total capacity is less than a predetermined (or, alternatively, determined or desired) reference ratio.

The arbiter 240 may set the split data to be transmitted to the RAID buffer unit based on a preset (or, alternatively, determined or desired) transmission sequence. For example, the arbiter 240 may set the split data to be transmitted to the RAID buffer unit in order that the split data stored in the first channel buffer 211_1 is transmitted to the RAID buffer unit first, and the split data stored in the second channel buffer 211_2 is transmitted to the RAID buffer unit.

Figure 11:
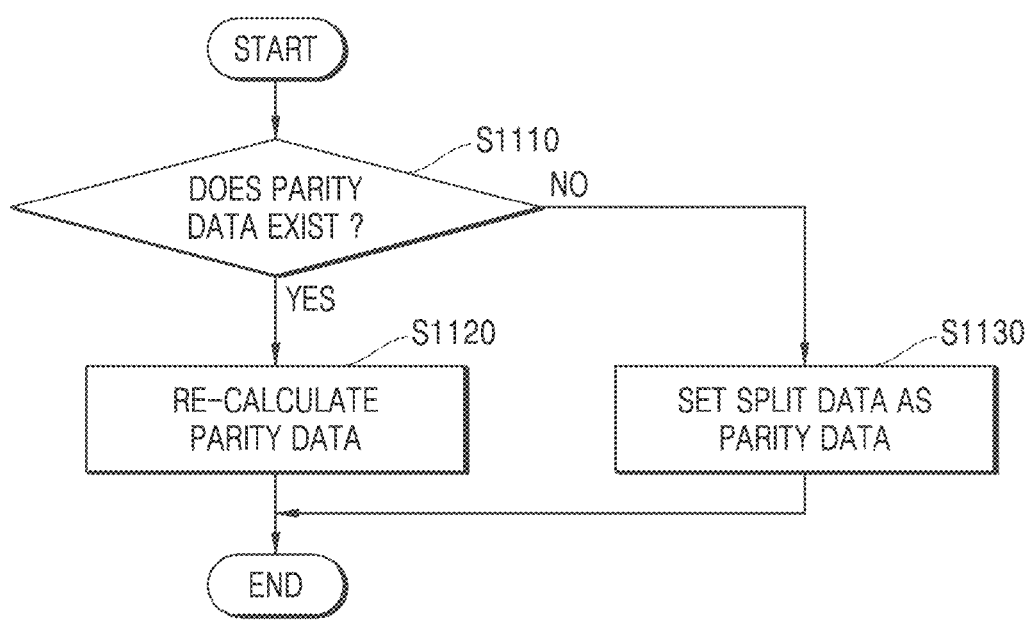
FIG. 11 is a flowchart illustrating a method of calculating parity data by a cache device of a RAID controller, according to some example embodiments.

FIG. 11 is a flowchart illustrating a method of calculating parity data by a cache device of a RAID controller according to some example embodiments.

Referring to FIG. 11, in operation S1110, the RAID controller 200 may determine whether parity data with the same RAID identifier and the same split identifier as those of the split data exists. That is, the RAID controller 200 may determine whether parity data with the same RAID identifier and the same split identifier as those of the split data is stored in the cache memory 232_1.

If parity data with the same RAID identifier and the same split identifier as those of the split data is stored, in operation S1120, the RAID controller 200 may re-calculate parity data based on the parity data stored in cache memory 232_1 and the received split data through the calculation circuit 232_2.

If parity data with the same RAID identifier and the same split identifier as those of the split data is not stored, in operation S1130, the RAID controller 200 may calculate the split data as parity data through the calculation circuit 232_2.

Figure 12:
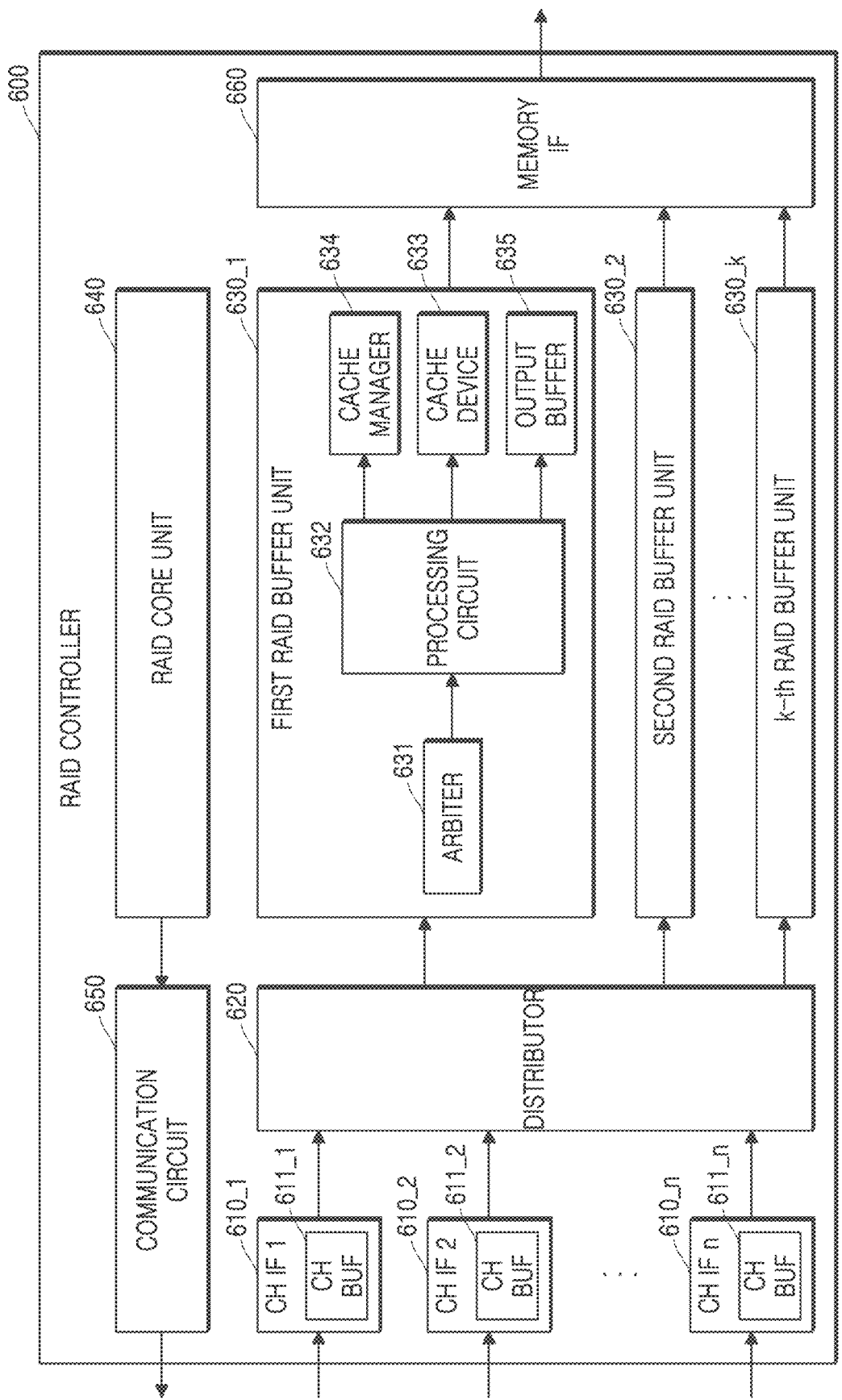
FIG. 12 is a block diagram illustrating a RAID controller according to some example embodiments.

FIG. 12 is a block diagram illustrating a RAID controller according to some example embodiments.

Referring to FIG. 12, the RAID controller 600 according to some example embodiments may include a plurality of channel interfaces 610_1 to 610_n, a distributor 620, and a plurality of RAID buffer units 630_1 to 630_k. In addition, the RAID controller 600 according to some example embodiments may further include a RAID core unit 640, a communication circuit 650, and a memory interface 660.

The operations of the plurality of channel interfaces 610_1 to 610_n, the distributor 620, the RAID core unit 640, the communication circuit 650, and the memory interface 660 of some example embodiments of FIG. 12 may be substantially the same as the operations of the plurality of channel interfaces 210_1 to 210_n, the distributor 220, the RAID core unit 250, the communication circuit 260, and the memory interface 270 of some example embodiments of FIG. 2.

Unlike some example embodiments of FIG. 2, each of the plurality of RAID buffer units 630_1 to 630_k of some example embodiments of FIG. 12 may include an arbiter 631. That is, unlike the arbiter 240 configured outside the plurality of RAID buffer units 230_1 to 230_k in some example embodiments of FIG. 2, the arbiter 631 may be included inside each of the plurality of RAID buffer units 630_1 to 630_k in some example embodiments of FIG. 12.

The arbiter 631 may set a transmission time point of the split data from the plurality of channel buffers 611_1 to 611_n to the plurality of RAID buffer units 630_1 to 630_k. In this case, the arbiter 631 included in the first RAID buffer unit 630_1 may set a transmission time point of split data from the plurality of channel buffers 611_1 to 611_n to the first RAID buffer unit 630_1.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. A redundant array of inexpensive disks (RAID) controller comprising:
    a plurality of channel interfaces configured to
        receive a plurality of data strips from a plurality of channels, each of the data strips including a RAID identifier relating the data strip to a respective data stripe,
        split each of the data strips into a plurality of pieces of split data,
        create split identifiers based on a number of pieces of split data of each of the data strips,
        store the split data, and
        assign the split identifiers respectively to each of the plurality of pieces of split data, split identifiers being shared between at least two of the pieces of split data of different data strips;
    a distributor configured to set, based on the split identifiers, a transmission path of the plurality of pieces of split data; and
    a plurality of RAID buffer units configured to receive the split data through the distributor and manage parity data corresponding to the split data.

2. The RAID controller of claim 1, wherein each of the plurality of channel interfaces comprises a channel buffer for temporarily storing the plurality of pieces of split data.

3. The RAID controller of claim 1, wherein
    each of the plurality of channel interfaces is configured to
        assign the split identifier independent of the RAID identifier to each of the plurality of pieces of split data, and
    the distributor is configured to set the transmission path of each of the plurality of pieces of split data to one of the plurality of RAID buffer units, based on the RAID identifier and the split identifier.

4. The RAID controller of claim 1, wherein
    each of the plurality of channel interfaces is configured to assign the split identifier, based on the RAID identifier corresponding to the data strip including each of the plurality of pieces of split data, and
    the distributor is configured to set the transmission path of each of the plurality of pieces of split data to one of the plurality of RAID buffer units, based on the split identifier.

5. The RAID controller of claim 1, further comprising an arbiter configured to control transmission of the plurality of pieces of split data of the plurality of channel interfaces.

6. The RAID controller of claim 5, wherein the arbiter is configured to set a transmission time point of each of the plurality of pieces of split data, based on a storage status of a channel buffer included in each of the plurality of channel interfaces.

7. The RAID controller of claim 5, wherein the arbiter is configured to set a respective transmission time point of each of the plurality of pieces of split data.

8. The RAID controller of claim 1, wherein each of the plurality of RAID buffer units comprises:
    a processing circuit configured to process operations related to the parity data; and
    a cache device configured to calculate the parity data, based on the split data, and store the parity data.

9. The RAID controller of claim 8, wherein each of the cache devices is configured to:
    during storing the split data, re-calculate the parity data based on the parity data stored in the respective cache device and the split data previously stored, in response to the parity data stored in the respective cache device having a same RAID identifier and a same split identifier as the parity data of the split data being stored, and
    during storing the split data, re-calculate the split data being stored as the parity data of the split data being stored in response to the parity data of the ta being stored having the same RAID identifier and the same split identifier as those of the split data not being stored.

10. The RAID controller of claim 7, wherein
    each of the plurality of RAID buffer units comprises
        a cache memory configured to store the parity data; and
        a calculation circuit configured to calculate the parity data, based
    on the split data and the parity data, and
    each of the calculation circuits comprises
        a write buffer configured to temporarily store the split data;
        a read buffer configured to temporarily store the parity data read from the cache memory of a same RAID buffer unit; and
        a logic circuit configured to re-calculate the parity data, based on the split data temporarily stored in the write buffer of a same calculation circuit and the parity data temporarily stored in the read buffer of the same calculation circuit.

11. The RAID controller of claim 10, wherein each of the calculation circuits is configured to calculate the respective parity data in a pipeline manner based on the write buffer of a same calculation circuit, the read buffer of the same calculation circuit, and the logic circuit of the same calculation circuit.

12. The RAID controller of claim 1, wherein each of the plurality of RAID buffer units comprises a cache manager for generating completion information of the parity data.

13. The RAID controller of claim 1, further comprising a RAID core unit configured to control overall operation of the RAID controller and store completion information of parity data corresponding to the plurality of pieces of split data.

14. The RAID controller of claim 13, wherein
the RAID core unit is configured to, based on processing a first type of data strip, control one or more of the plurality of RAID buffer units to operate as a volatile memory.

15. The RAID controller of claim 13, wherein the RAID core unit blocks one or more of the RAID buffer units during processing a first type of data strip.

16. An operation method of a redundant array of inexpensive disks (RAID) controller including a plurality of channel interfaces, a distributor, and a plurality of RAID buffer units, the operation method comprising:
receiving a plurality of data strips over the plurality of channel interfaces, each of the data strips including a RAID identifier relating the data strip to a respective data stripe;
dividing each of the data strips into a plurality of pieces of split data by the channel interface of the plurality of channel interfaces having received the data strip;
creating split identifiers based on a number of pieces of split data of each of the data strips,
assigning the split identifiers respectively to each of the plurality of pieces of split data by the channel interface having received the data strip, split identifiers being shared between at least two of the pieces of split data of different data strips;
setting, by the distributor, a respective transmission path of each of the plurality of pieces of split data to one of the plurality of RAID buffer units;
transmitting the plurality of pieces of split data to one of the plurality of RAID buffer units through the distributor; and
calculating and storing parity data corresponding to the split data by each of the RAID buffer units.

17. The operation method of a RAID controller of claim 16, further comprising, after dividing the data strip into the plurality of pieces of split data, storing the plurality of pieces of split data in a channel buffer included in the channel interface, by the channel interface receiving the data strip.

18. The operation method of a RAID controller of claim 16, wherein the transmitting of the plurality of pieces of split data to one of the plurality of RAID buffer units comprises:
setting, by an arbiter included in the RAID controller, a respective transmission time point of each of the plurality of pieces of split data; and
transmitting the plurality of pieces of split data to one of the plurality of RAID buffer units, based on the transmission time points set by the arbiter.

19. The operation method of a RAID controller of claim 16, wherein the calculating of the parity data comprises:
re-calculate the parity data based on the parity data stored in a respective cache device and the split data previously stored, in response to the parity data stored in the respective cache device having a same RAID identifier and a same split identifier as the parity data of the split data being stored; and
re-calculate the split data being stored as the parity data of the split data being stored in response to the parity data of the split data being stored having the same RAID identifier and the same split identifier as those of the split data not being stored.

20. A storage device comprising:
a processor configured to output a plurality of data strips through a plurality of channels, each of the data strips including a redundant array of inexpensive disks (RAID) identifier relating the data strip to a respective data stripe;
a RAID controller configured to split each of the data strips into a plurality of pieces of split data and generate a plurality of pieces of parity data corresponding to the plurality of pieces of split data;
a volatile memory configured to temporarily store the plurality of pieces of parity data generated by the RAID controller; and
a non-volatile memory configured to store the plurality of pieces of parity data stored in the volatile memory,
wherein the RAID controller comprises
a plurality of channel interfaces configured to split the data strip into the plurality of pieces of split data and store the split data, create split identifiers based on a number of pieces of split data of each of the data strips, and assign the split identifiers respectively to each of the plurality of pieces of split data, split identifiers being shared between at least two of the pieces of split data of different data strips,
a distributor configured to set, based on the split identifier, a respective transmission path of the plurality of pieces of split data, and
a plurality of RAID buffer units configured to receive the split data through the distributor and manage parity data corresponding to the split data.

* * * * *